United States Patent [19]

Clason

[11] 3,778,888
[45] Dec. 18, 1973

[54] METHOD OF APPLYING A FIELD CONTROL DEVICE TO AN INSULATED CONDUCTOR OF A CABLE AND AN APPARATUS FOR CARRYING OUT THE METHOD

[75] Inventor: Jan C. Clason, Engelo, Netherlands

[73] Assignee: N. V. Fabriek Van Electrische Apparaten Voorheen F. Hazemeijer & Co., Hengelo, Netherlands

[22] Filed: May 3, 1971

[21] Appl. No.: 139,803

[30] Foreign Application Priority Data
May 1, 1970  Netherlands........................ 7006483

[52] U.S. Cl.................. 29/592, 29/624, 29/630 F, 174/73 R, 174/127
[51] Int. Cl............................................. H01s 4/00
[58] Field of Search.............. 29/592, 624, 628–630; 174/19–21, 107–109, 73–77, 127, 140, 145, 32–36, 89, 212; 339/13, 28, 149–150, 172, 201, 206, 213; 81/9.5, 9.81

[56] References Cited
UNITED STATES PATENTS
| | | | |
|---|---|---|---|
| 2,014,635 | 9/1935 | Polgov.............................. | 174/19 X |
| 2,322,702 | 6/1943 | Peterson......................... | 174/73 SC |
| 2,355,545 | 8/1944 | Meyerhans....................... | 174/74 A |

*Primary Examiner*—Charles W. Lanham
*Assistant Examiner*—Joseph A. Walkowski
*Attorney*—Watson, Cole, Grindle & Watson

[57] ABSTRACT

Method of applying a field control device to an insulated conductor of a cable, the insulation of which is surrounded by an adhering layer of semi-conductive material including the steps of cutting an annular groove in said insulation in an axial direction and bending the sleeve formed thereby outwardly of said cable.

An apparatus for cutting an annular groove in the insulation of the cable is also provided.

3 Claims, 7 Drawing Figures

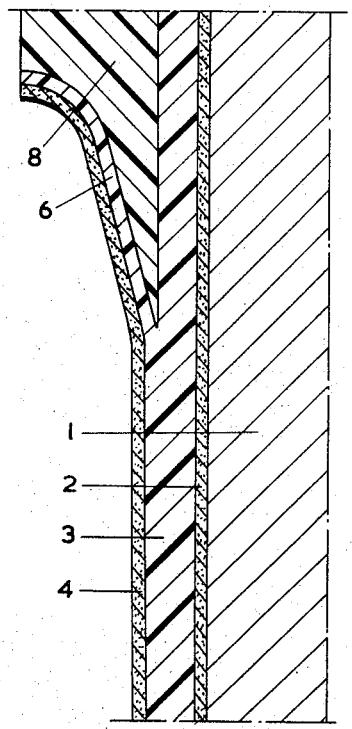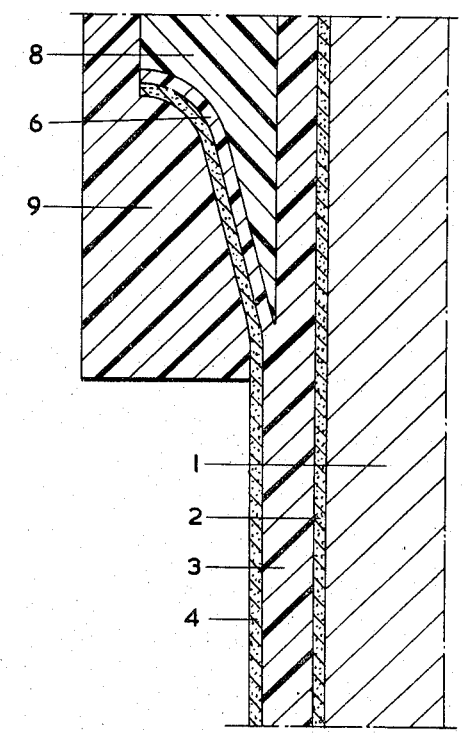

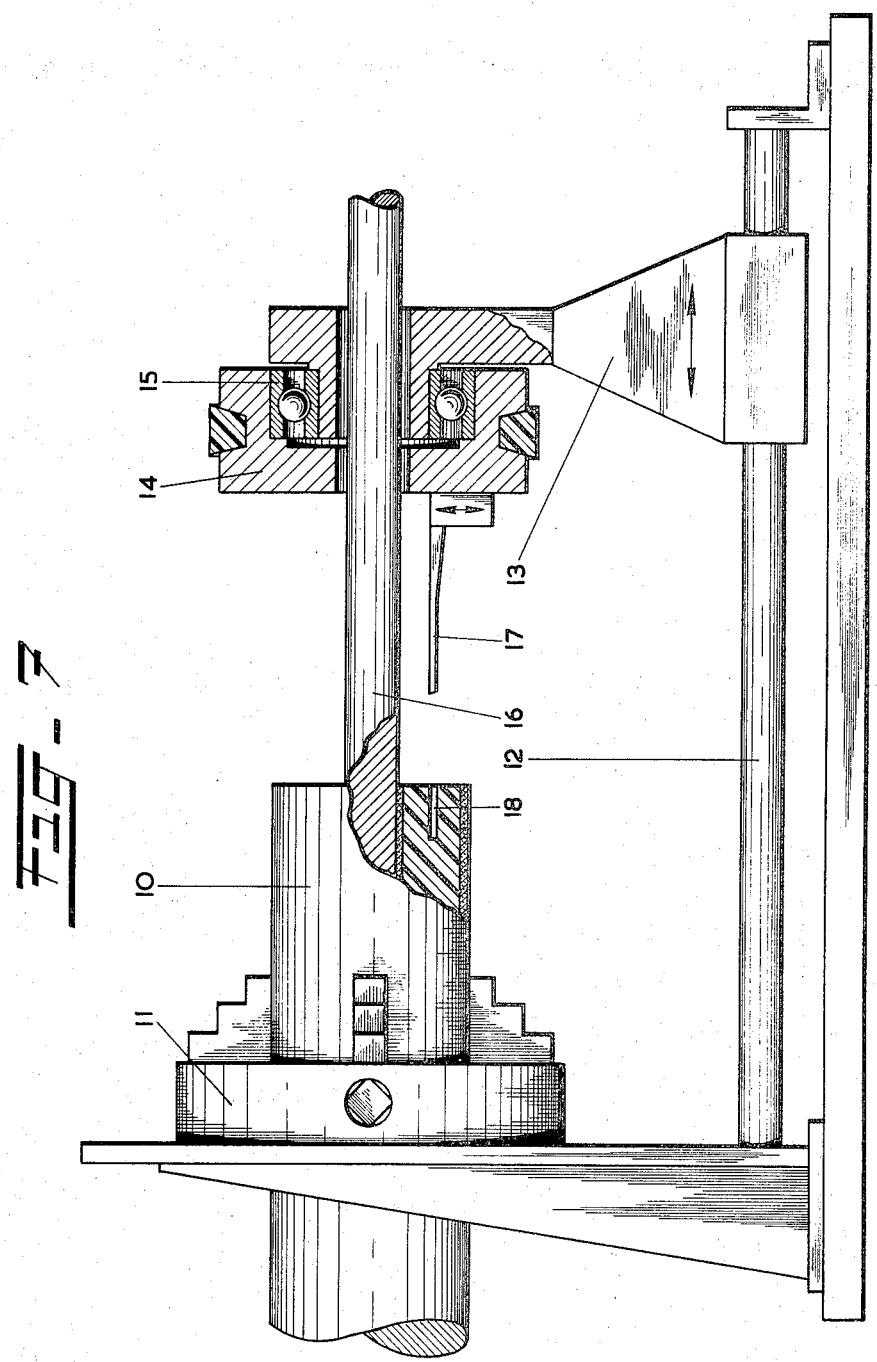

METHOD OF APPLYING A FIELD CONTROL DEVICE TO AN INSULATED CONDUCTOR OF A CABLE AND AN APPARATUS FOR CARRYING OUT THE METHOD

This invention relates to a method of applying a field controlling device to an insulated conductor of a high voltage cable and to an apparatus for carrying out the method.

More particularly, this invention relates to applying a field controlling device to the end of an insulated cable conductor, the insulation of which comprises rubber or similar elastic material and is surrounded by a layer of semi-conductive rubber or similar layer of elastic conductive material. Said layer is integral with the insulation in such a way that no voids are present between both layers and no such voids will form after an extended time.

This invention further relates to applying a field controlling device to the end of an insulated cable conductor, the insulation of which comprises a solid insulating material which, by heating or in some other way, for example, may temporarily be converted into the elastic condition.

With the meteods of applying a field controlling device to insulated cable conductors of the type concerned which have been used until now, the outer conductive layer at the end of the insulated cable conductor is stripped-off to a predetermined extent whereafter a field controlling body of insulating material is applied to this exposed part, an electric contact being established between the electrically conductive coating of the field controlling body and the semi-conductive outer layer of the insulated conductor of the cable. Care had to be taken, however, that no discontinuities of the electric field occur at the junction of both said conductive layers. A further problem occurring with this known method is that it is necessary to remove the semi-conductive layer from the insulation very carefully. Frequently, this is done by a grinding process, but, then it is necessary for the thicknesses and centricities of the layers to be within small tolerances. In order to avoid this difficulty the adherence between the insulation and the semiconductive layer had to be made so weak so that the latter could be detached or torn off without damaging the insulation. It is a disadvantage of such method that, in normal use of the cable, the adherence between the layers may be broken and voids may form between both layers in which voids electric discharges may occur, which may initiate an electric breakdown of the cable.

According to the method of the present invention, the aforementioned disadvantages are avoided by cutting the insulation material at the end of the insulated cable conductor in an axial direction or mainly in an axial direction about the conductor, deflecting and/or bending over the insulation which is outside the cutting groove and subsequently filling the space between the part which deflected deflectbd and/or bending over and the portion of the insulation remaining about the conductor completely or partially with insulating material.

The invention is particularly intended for applying a field controlling device to an insulated conductor of a cable, the insulation of which is surrounded by an adhering layer of semi-conductive material. By deflecting or bending over the sleeve positioned outside the cutting groove, it is possible to give the shape desired for the field control operation to the simi-conductive layer. Use may be made of an annular ring disposed around the insulating conductor about which the sleeve is bent over, or of a wedge-shaped ring, which is pressed into the cutting groove. If the layer of semi-conductive material would be damaged by the deflecting and/or bending operation of the sleeve, it may be repaired with semi-conductive lacquer. If the insulated cable conductor is not provided with a semi-conductive outer coating, which may occur with the use of short cable sections, after the deflecting or bending operation of the sleeve, for example by means of a semi-conductive lacquer, the outside of the insulated cable conductor together with the portion being deflected or bended over may be rendered electrically conductive.

The invention will now be further described with reference to several examples below and to FIGS. 1 through 6 of the accompanying drawings wherein:

FIGS. 5 and 6 are views similar to FIG. 2, showing in addition another manner of applying a field device to the cable; and FIG. 7 schematically shows an apparatus for producing a cut in the cable insulation.

EXAMPLE I

Figure 1:
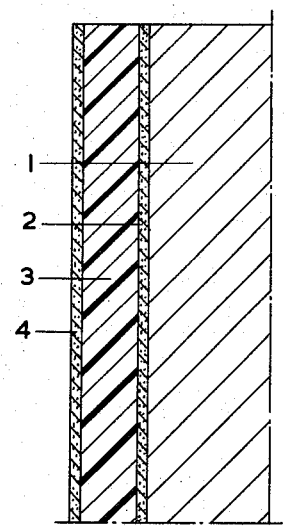
FIG. 1 is a longitudinal half-sectional view of an insulated cable conductor as it appears before the field control device is applied.

In an insulated cable conductor according to the structure shown in FIG. 1 in which 1 is a conductor of copper, 2 a layer of Ethylene-Propene rubber (EPR-rubber), which is rendered semi-conductive by admixing carbon black as a filler material, 3 a layer of a mixture of EPR-rubber and insulating material and 4 another layer of EPR-rubber similar to 2. The annular cutting groove 5 shown in FIG. 2 is made by means of the apparatus shown in FIG. 1.

Figure 3:
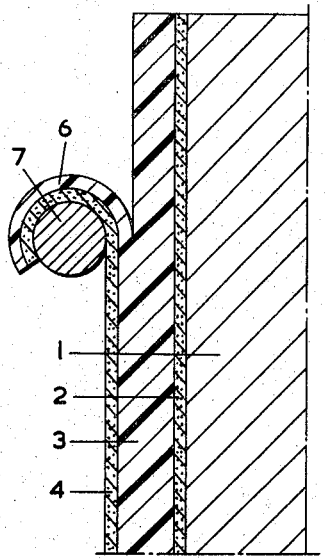
FIGS. 3 and 4 are views similar to FIG. 2, showing in addition a manner of applying a field device to the cable.
Figure 4:
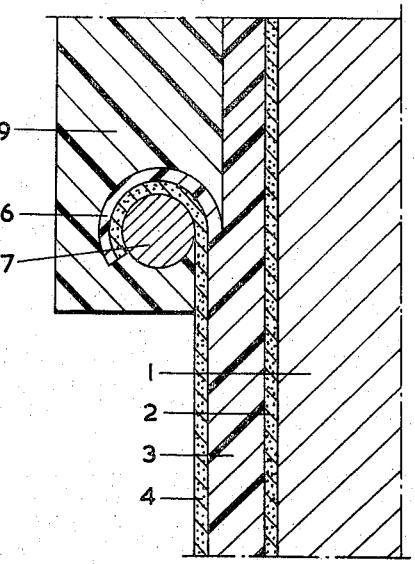

Outer sleeve 6, formed by the groove 5, may therefore be bent over about an annular ring 7 disposed about the cable in a manner as shown in FIG. 3. The field control device obtained thereby may be surrounded by a molded resin body 9 in a manner as shown in FIG. 4.

EXAMPLE II

Figure 2:
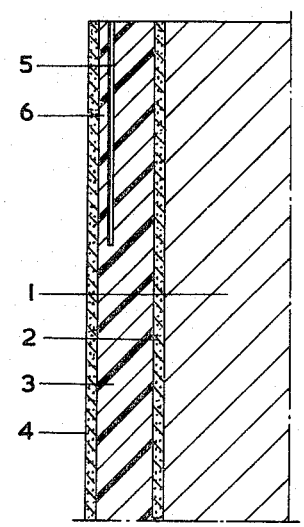
FIG. 2 is a view similar to FIG. 1, showing in addition a cutting groove applied in the first step of the method in accordance with the invention.

After carrying out the invention in accordance with FIG. 2, a profiled body of insulating material 8 is pressed into groove 5 in a manner as shown in FIG. 5. The field control device obtained in this way may be surrounded by a molded resin body 9 as seen in FIG. 6.

EXAMPLE III

An insulated cable conductor of the type shown in FIG. 1 and having an insulation of cross-linked polyethylene is treated in a manner as indicated in Example II, and after the cutting groove has been made, the end of the insulated cable conductor is heated, by means of an infrared radiation or a hot gas flow, for example, in such manner that the cut portion of the conductor insulation is rendered rubber elastic. The temperature which is necessary for this purpose will depend on the cross-linking degree of the polyethylene and will be between 140° and 200° C. After the material has become rubber-elastic, an annular body of the desired shape is pressed into the cutting groove as quickly as possible and in such a way as indicated by Example II, whereafter the cable end is finished in the manner as indicated by Example II.

For carrying out the method according to the invention, use may be made of an apparatus which comprises a means for clamping an insulated cable conductor at its end, a means to cause a needle or knife, the width of which is small with respect to its length, to make a revolving motion and means to vary the spacing from the needle or knife to the axis of the insulated conductor, and means to move the needle or the knife during the revolving motion into a direction, parallel to or mainly parallel to the axis of the insulated conductor.

Such apparatus for producing a cut in the insulation is schematically illustrated in FIG. 7. As shown, tbe insulated cable conductor 10 to be treated is secured into a chuck 11 which is rigidly connected to a frame 12, along which is movable a support 13 having a motor. The motor serves to rotate a cylindrical body 14 about the geometrical axis of a ball-bearing 15 through which the cable conductor 16 is fed. A needle 17 is adjustably mounted to the cylindrical body and produces the abovementioned cutting groove 18 in the conductor insulation, if the support is moved towards the chuck with the motor revolving.

What is claimed is:

1. A method fo applying a field control device to a shielded insulated conductor cable, comprising the steps of providing a conductor having a solid annular insulating layer thereon wbich includes an integral annular layer of semiconductive material on the outer surface of said insulating layer, cutting an annular groove in said solid insulating layer adjacent said semiconductive material layer in an axial direction at one end of said cable to form two integral insulating and semiconductive sleeves outwardly of said cable, and bending the outer sleeve formed by said cutting operation outwardly of said cable to form the desired field control shape.

2. The method according to claim 1 wherein said sleeve is bent outwardly of said cable by inserting a wedge member into said groove, said wedge member serving to shape said cable one end in a manner desired for the field control.

3. The method according to claim 1 wherein said sleeve is bent outwardly of said cable over an annular ring member disposed about said cable one end, said ring member thereby serving to shape said cable one end in a manner desired for the field control.

* * * * *